Feb. 16, 1937. E. WILCKENS 2,070,701
ELECTRICAL SOUND EMITTING APPARATUS
Filed March 30, 1933  3 Sheets-Sheet 2
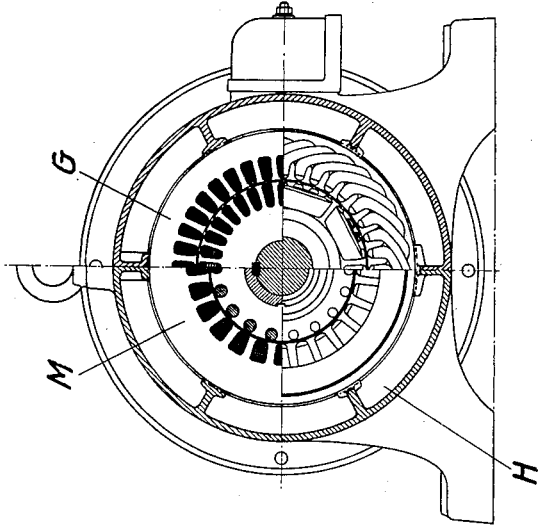
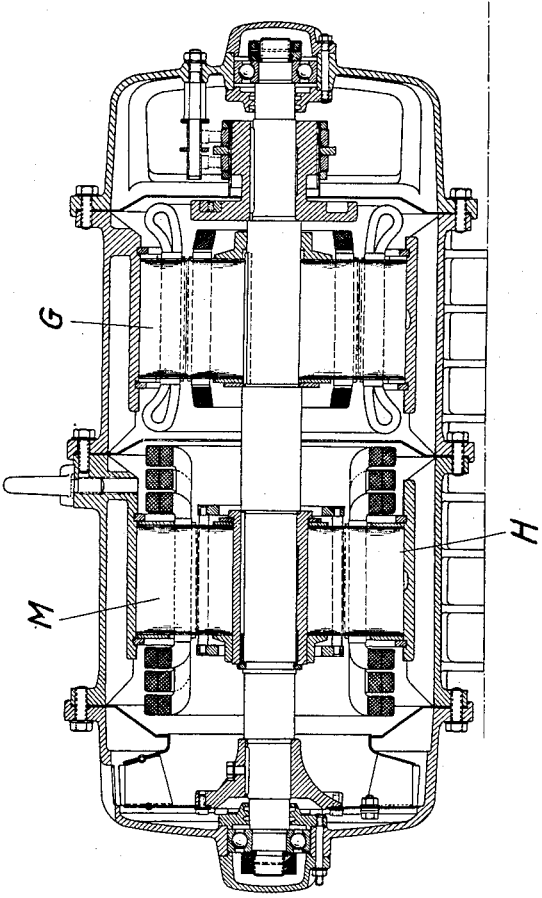
Inventor:
E. Wilckens
By: Marks & Clerk
Attys.

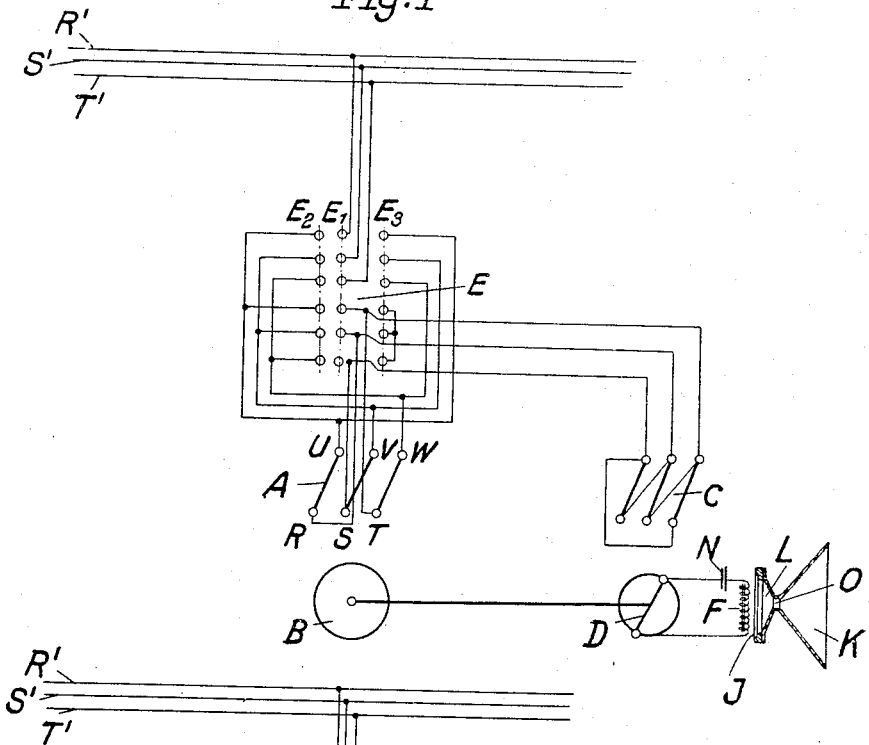
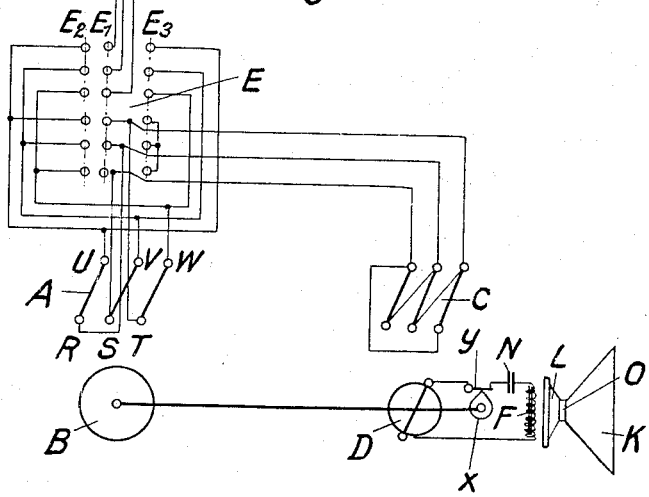

Feb. 16, 1937.  E. WILCKENS  2,070,701
ELECTRICAL SOUND EMITTING APPARATUS
Filed March 30, 1933  3 Sheets-Sheet 3
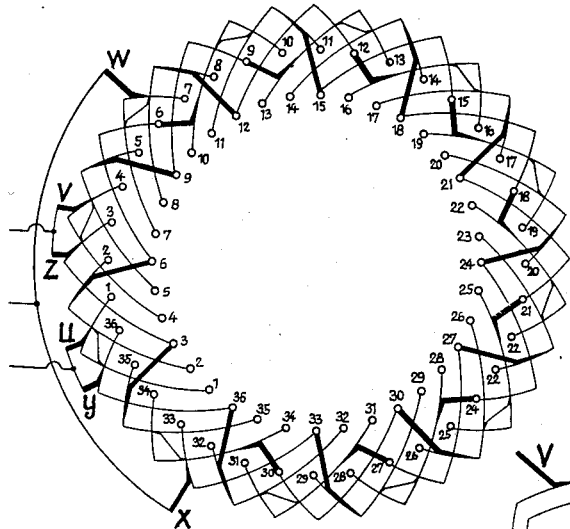
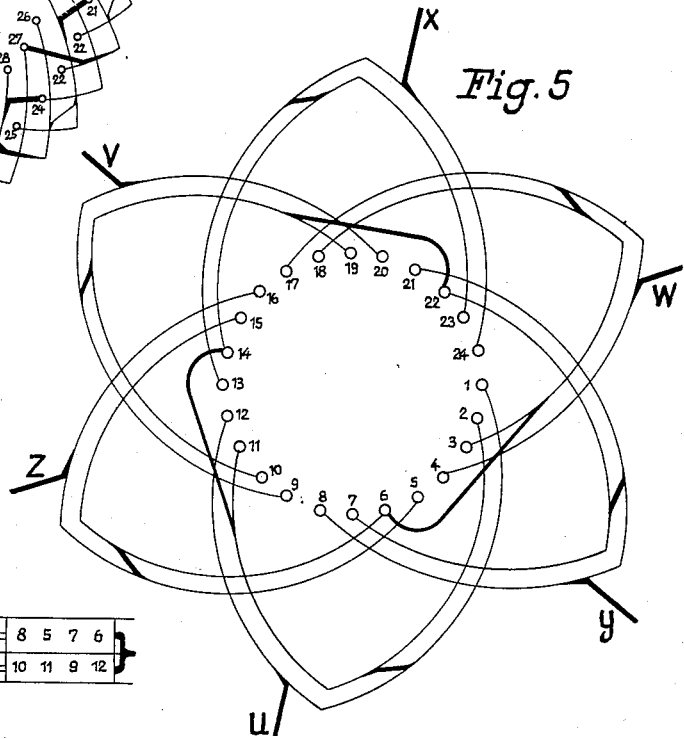
Fig.6
Fig.5
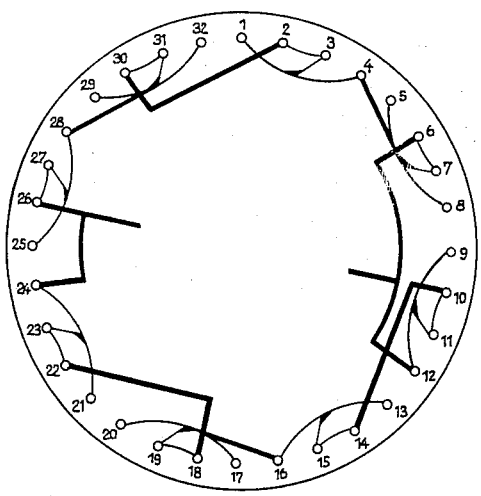
Fig.7
Inventor:
E. Wilckens
By: Marks & Clerk
Attys.

Patented Feb. 16, 1937

2,070,701

UNITED STATES PATENT OFFICE 2,070,701

ELECTRICAL SOUND-EMITTING APPARATUS

Ernst Wilckens, Berlin-Lichterfelde, Germany, assignor to N. V. Machinerieen-en Apparaten Fabrieken, "Meaf", Utrecht, Netherlands Application March 30, 1933, Serial No. 663,635
In Germany October 26, 1927

4 Claims. (Cl. 177—7)

This invention relates to electrical sound emitting plants used for sending signals for aerial and marine navigation and other purposes and has for its object to operate plants of this class from a three-phase network.

In these plants a sound emitter of the known type is made use of in which a steel diaphragm is set oscillating by means of an electromagnet which is excited by alternating current. The sound produced by the oscillations of the diaphragm is conducted to the surrounding air by a horn.

It is known already to feed such an apparatus with alternating current of medium frequency and thus to produce vibrations of the diaphragm amounting to twice the alternating current frequency, but, since the usual three-phase supplies have a low frequency ranging from approximately 40 to 60 periods per second, it is necessary to produce the requisite medium frequency in a separate converter. Such medium frequency ranges from approximately 200 to 300 cycles per second.

This was previously done by driving a medium frequency generator with a synchronous motor and, as the synchronous motor requires direct current for excitation, by combining with this arrangement a direct current machine which supplies the exciting current for the synchronous motor, as well as for the medium frequency generator. A synchronously running driving motor was used to keep the medium frequency produced as constant as possible.

This solution of the problem suffers, however, from several drawbacks, the most serious of which is the use of direct current. This will be readily understood if it is taken into consideration that apparatus of this kind intended to serve as fog signals or alarm plants have to be operated in most cases by persons unskilled in their use, and as the direct current generator, owing to its collector and brush apparatus, is relatively sensitive and requires careful attendance, it is necessary to avoid the use of direct current as much as possible.

The second drawback connected with the above solution is that the machine aggregate is relatively complicated, of large dimensions and considerable weight, since it combines three machines which need quite a long and heavy base plate and, in addition, two couplings. The space required by such an aggregate is therefore sometimes undesirably large.

The third drawback is that the medium frequency generators used were, as a rule, specially designed for the purpose, such as homopolar induction type, a machine similar to Alexanderson's style, or the like, and of course quite expensive, as they were built relatively rarely and in little series, so that the entire apparatus was so high-priced that its use for certain purposes, such as fire alarm and the like, was out of the question.

The invention eliminates all these drawbacks. In a plant according to this invention an asynchronous motor drives a generator for generating a single-phase alternating current, the stator of the motor as well as that of the generator being excited by three-phase alternating current. The set contains no direct current generator, it only consists of two very simply constructed machines and the generator is not of special design but composed of standard constructional parts of a three-phase slip ring induction motor, all these advantages being attained by employing an asynchronous single phase induction converter as described below.

A standard squirrel cage motor serves for driving and is coupled with a generator resembling in appearance a standard slip ring motor. The stator of this generator is preferably provided with a number of pairs of poles and is excited with three-phase alternating current whereby a rotating field is produced inside rotating at a speed corresponding to the periodicity of the network and the number of poles of the winding. The rotor of the generator has single-phase winding with the same number of poles as the stator, and is driven by the driving motor in a direction opposite to that of the rotating field in the stator, whereby single-phase alternating current of increased frequency is produced in the rotor.

For the sake of better explanation a practical example may be considered based on the following assumptions:

The three-phase network has 50 periods. The driving motor is bipolar and thus runs at about 50 revolutions per second.

The stator and rotor winding of the generator have eight poles, that is, four pairs of poles each.

Assumed that the stator of the generator is excited by direct current so that eight salient poles, that is, four pairs of poles are formed. If in this case a rotor winding having also eight poles rotates at 50 revolutions per second, a current having a frequency of 50 times $$\frac{8}{2}=200 \text{ periods per second}$$

will be induced in the rotor winding. If the stator, as direct current is usually not available, would be supplied with ordinary alternating current, there would naturally be produced alternating current of higher frequency, but it would be modulated, that is, it would fluctuate periodically as to amplitude and thus not be suitable, as a rule, to serve as signal current. The invention therefore proposes to utilize in the stator a rotating field whereby, on the one hand, independence from direct current sources is insured, and, on the other, modulation is avoided. If the rotating field is made to rotate opposite to the direction of rotation of the rotor, the rotor frequency will even be increased at the same time as compared with excitation of the stator with direct current, corresponding to the speed of the field. Since at a complete rotation of a rotor winding the stator rotating field has advanced one-fourth of the circumference in the opposite direction, the rotor frequency will be increased one-fourth of what it would be in case of a direct current field, that is, from 200 to 200 times $$\frac{5}{4} = 250 \text{ periods per second}$$

This frequency is adapted to feed the transmitter and produces, as in any non-polarized telephone, a sound of 500 vibrations per second.

The invention is illustrated in the accompanying drawings, in which

Figure 1 shows diagrammatically an embodiment of this invention;

Fig. 2 shows a modification of a detail which enables to give not only a continuous sound but also a characteristic signal as for instance a Morse letter;

Fig. 3 is a longitudinal section of the entire machine;

Fig. 4 is partly a view of the machine and partly a cross section thereof; and

Figs. 5, 6 and 7 show, respectively, the wiring diagram of the motor, generator stator and rotor.

In a common casing H, as shown in Fig. 3, the motor M is disposed to the left and the generator G to the right. Fig. 4 shows in the lower half portion the external appearance of the motor to the left and that of the generator to the right, and, in the upper half, corresponding sections of the motor and generator. The motor has twenty-four slots in the stator in which in the usual way (see the wiring diagram shown in Fig. 5) a bi-polar three-phase winding is disposed. The squirrel cage rotor has a cage of eighteen bars.

The stator of the generator has thirty-six slots in which an eight pole three-phase winding connected in delta is inserted in accordance with the winding diagram of Fig. 6. Each slot contains two sets of conductors bearing the numerals 1 to 36 in Fig. 6, the numbers for the lowermost sets being displaced four slots with respect to the sets lying uppermost in the slots, which corresponds to the winding pitch also amounting to four slots, so that the winding extends for one phase from the upper slot 1 (inner circle in Fig. 6) to the lower slot 1 (outer circle) and also from 2 (inside) to 2 (outside), and furthermore, in an inverted sense of winding, from 6 (inside) to 6 (outside). The conductors mentioned form a pair of poles for one of the three phases. The further course of the winding producing a pole arc of four and one-half slots is shown in the diagram of Fig. 6.

Fig. 7 shows the rotor circuit. Two parallel circuits are formed and each of them has four poles. The winding passes for instance for one circuit from slot 26 to 27, then from 25 to 28, further from 32 to 29, from 31 to 30 and so forth, according to the diagram shown, and in such a way that succeeding poles have an inverted sense of winding.

In Fig. 1 A is the stator winding of the squirrel cage motor, B the squirrel cage itself, and on the same axis is the rotor D of the generator which is excited by the stator winding C.

J is a steel diaphragm which is set oscillating by means of an electromagnet F disposed on its backside. The electromagnet is excited by alternating current supplied by the generator D. The number of natural oscillations of the diaphragm must be in a certain relation to the frequency of the exciting alternating current so as to insure large deflections of the diaphragm and good efficiency. The sound produced by the oscillation of the diaphragm is conducted to the surrounding air by the horn K shown in Fig. 1. The air space L positioned immediately in front of the diaphragm and enclosed on one side by the diaphragm and on the other by a portion of the horn K is also capable of vibration, its vibrations depending on the enclosed air volume and the size of the opening O.

When the converter is relatively low-powered, it can be switched on by means of an ordinary lever switch. In large converters, however, the relatively high starting current is sometimes not desirable, since it would cause a large voltage drop in the conductors and flickering of any connected light, and in such cases the converter is therefore started by means of a star delta switch which connects the stator winding of the driving motor first in star connection and then, after the reversing of the star delta switch, in delta connection. The motor always runs in delta connection when in operation. For example, if the supply network has a voltage of 3 times 220 volts, the motor, when in delta connection, must be adapted 3 times 220 volts. In star connection, it would then be adapted to 3 times 380 volts per se, but in the position 1 of the star delta swich it is star-connected only to 220 volts, and it is evident that the closing current rush will be correspondingly reduced thereby. In Fig. 1 the star delta switch is indicated by the letter E. In switching position 1 the contact series E₁ is connected with the contact series E₃, so that from the three phases R'S'T' of the network voltage may reach the terminals UVW of the motor winding A while the terminals RST are interconnected by the star delta switch. The motor A operates in star connection. In position 2, the contact series E₁ is connected with the contact series E₂ whereby the terminals UVW will receive voltage again, the motor winding being, however, connected by the star delta switch so that the terminal R is connected with the terminal V, the terminal S with W, and the terminal T with U. The motor operates in star connection.

The exciting winding C of the generator is switched on only when the motor is in delta connection, so that the winding C is not supplied with current before the last starting moment and the current supply of the winding R begins therefore only after the converter has attained already almost its full speed, that is, the converter produces then almost the full frequency, so that the sound comes out properly and does not scream or howl at the beginning as is the case with rotary sirens.

Fog signals must often be produced in a certain rhythm and not continuously, which is preferably achieved by an automatic switch Y which is driven by a cam disc X from the converter shaft, possibly by means of a transmission gear, the cam disc X having projections and recesses according to the desired group of signals, as indicated in Fig. 2.

To keep the dimensions of the converter as small as possible, it is advisable, to connect a condenser N in the transmitter circuit, as shown in Figs. 1 and 2. In this case the generator need only deliver the real power required by the sound emitting apparatus while the current for magnetizing is supplied by the condenser. In Figs. 1 and 2 the condenser is connected in series with the transmitter, although it may be connected parallel also. If properly dimensioned the condenser, at any rate, will supply the idle power, so that the dimensions of the generator may be correspondingly smaller, or, in other words, the medium frequency circuit comprising generator, condenser and transmitter must be adapted to the frequency of the exciting alternating current.

It is evident that the switching operation I—II of the star delta switch E, as manually carried out and described above, can be attained also by relay control for starting the plant from a longer distance.

I claim:—

1. An apparatus for creating sound signals comprising in combination a source of alternating current, of a common distribution frequency, a motor-generator set driven and excited by said alternating current and producing a frequency, ranging from approximately 200 to 300 cycles per second, suitable for operating a sound transmitter, and a non-polarized sound transmitter energized by said generated frequency.

2. An apparatus for creating sound signals comprising in combination a source of alternating current of a common distribution frequency, a motor-generator set driven and excited by said alternating current and producing a medium frequency of approximately 250 cycles per second, suitable for operating a sound transmitter, and a non-polarized sound transmitter energized by said generated frequency.

3. An apparatus for creating sound signals comprising in combination a source of alternating current of a common distribution frequency, a motor-generator set driven and excited by said alternating current and producing frequencies ranging from approximately 200 to 300 cycles per second, suitable for operating a sound transmitter, a non-polarized sound transmitter energized by said generated frequency and a star-delta starting switch connecting said source of current to said motor in star for starting and delta for running and to said generator in delta for running to allow said motor to obtain approximately full speed before said generator is excited.

4. An apparatus for creating sound signals comprising in combination a source of alternating current, of a common distribution frequency, a motor-generator set driven and excited by said alternating current and producing a frequency ranging from approximately 200 to 300 cycles per second, suitable for operating a sound transmitter, a non-polarized sound transmitter energized by said generated frequency by means of a connecting electrical circuit, and a switch driven by the shaft of the generator to intermittently interrupt the generated current in said circuit.

ERNST WILCKENS.